Patented Sept. 5, 1950

2,521,444

UNITED STATES PATENT OFFICE 2,521,444

TREATMENT OF ISOMERIC AROMATIC COMPOUNDS

Lloyd F. Brooke, Berkeley Highland Terrace, and Gordon E. Langlois, El Cerrito, Calif., and Arthur E. Stickland, Mount Royal, Montreal, Quebec, Canada, assignors to California Research Corporation, San Francisco, Calif., a corporation of Delaware Application June 28, 1946, Serial No. 680,156

14 Claims. (Cl. 260—668)

The present invention relates to the treatment of isomeric aromatic compounds and pertains most particularly to the resolving of mixtures of isomeric para- and meta-dialkylbenzenes, especially those isomeric mixtures which cannot be separated readily by fractional distillation.

Some isomeric aromatic compounds, such as dialkylbenzenes, boil at temperatures so close together that separation by fractionation is not practical. For example, para-xylene boils at 281.03° F. and meta-xylene has a boiling point of 282.39° F.; therefore, mixtures of these two xylenes cannot be readily separated by fractionation. It has heretofore been proposed for the separation of xylene mixtures to partially sulfonate the mixture and then to fractionally crystallize out the preferentially sulfonated product, meta-xylene sulfonic acid, and thereafter to hydrolyze the separated sulfonic acid compound to obtain pure meta-xylene. This and other prior methods have not come into use for various reasons, including low yields, lack of product purity and other disadvantages.

It is, therefore, an object of this invention to provide an improved method of separating isomeric aromatic compounds, which method is simple and straightforward and permits flexible and efficient plant process design.

A particular object of this invention is to provide a simplified method of separating meta- and paraxylenes by a solvent extraction process.

It is a further object to provide a combination extraction and isomerization process wherein either the extracted or unextracted isomer is isomerized to yield a mixture from which further quantities of the desired isomer are separated by solvent extraction. By means of this combination of steps a mixture of isomeric xylenes may be substantially completely converted to the desired isomer.

It is also an object of this invention to provide a method of resolving mixtures of isomeric aromatic compounds into their constituent isomers by means of a liquid mixture of HF and BF₃.

By means of the process of the present invention, which involves the solvent extraction of isomeric aromatic compounds, such as isomeric xylene mixtures, with a liquid mixture of HF and BF₃, a simple and improved separation of said isomeric constituents is readily and inexpensively obtained. By varying the proportions of HF and BF₃ in their mixture, as well as the ratio of said HF, BF₃ mixture to aromatic compounds being treated, either substantially pure isomers or a fraction enriched with one isomer may be obtained. The solvent, which may or may not form a loose chemical bond or complex with an isomer is readily recovered for recycle, which ease of recovery permits a simplified process flow.

Further objects and advantages of the present invention will be readily apparent from the following description taken in reference to the drawings, wherein.

Figure 1:
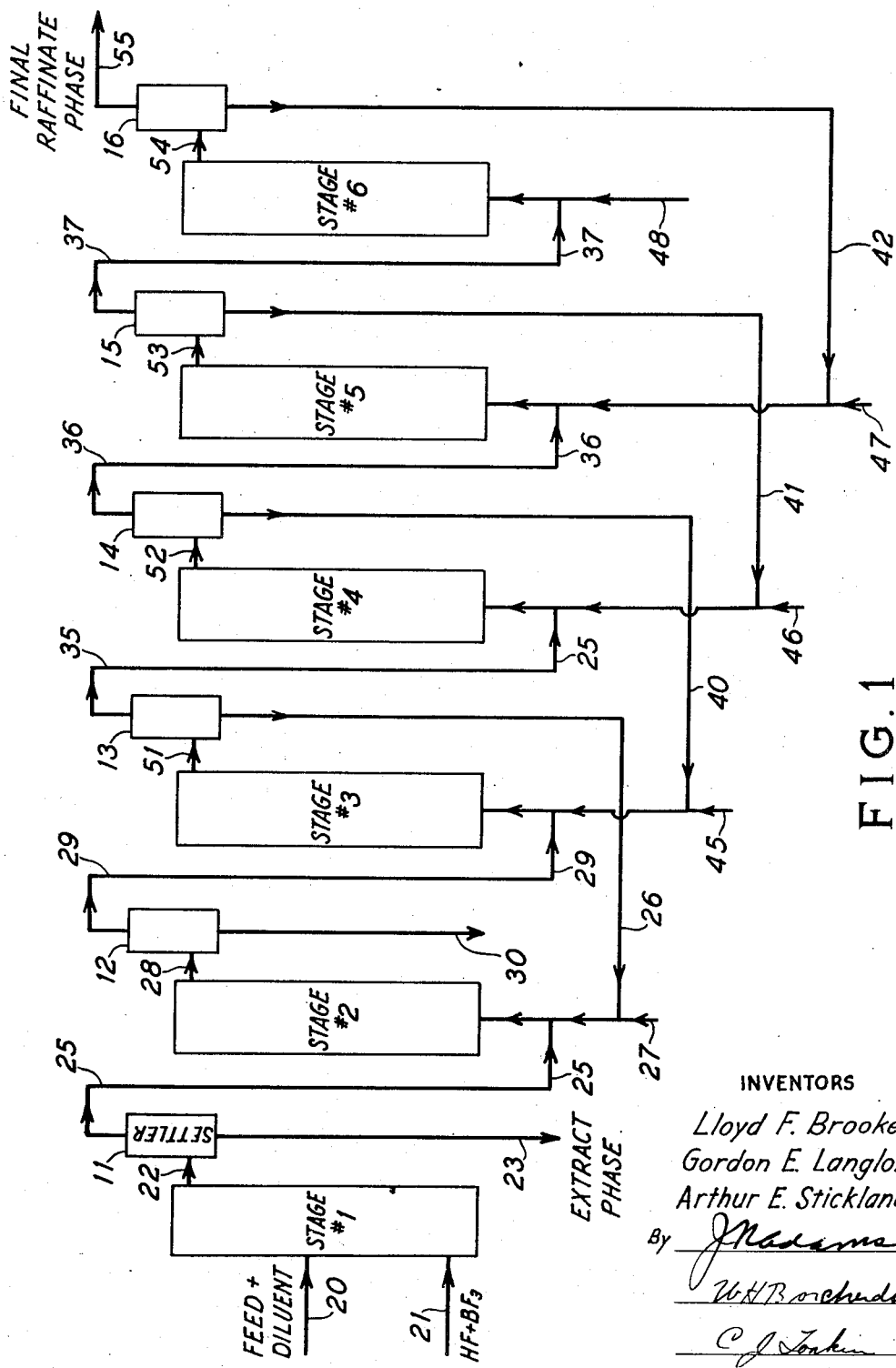
Figure 1 is a schematic flow diagram of an embodiment of the separation system of the present invention.

In accordance with the present invention, a mixture of isomeric aromatic compounds is thoroughly contacted with a liquid mixture of HF and BF₃, whereby one of the isomers is preferentially absorbed in the HF, BF₃ liquid; thereafter, the phase of remaining unabsorbed compounds is separated from the enriched solvent; and subsequently, the absorbed isomer is freed from the HF, BF₃ solvent phase.

The present process is preferably applied to the separation of xylenes. Thus, from xylene mixtures meta-xylene is preferentially absorbed in the HF, BF₃ liquid, ortho-xylene being separated by fractional distillation before or after treatment of the xylene mixture with HF, BF₃ liquid. While separation of xylenes constitutes the preferable and especially advantageous application of the present process, beneficial results and some of the advantages of the present invention will be obtained when the present process is applied to the separation of mixtures of other isomeric dialkyl aromatic hydrocarbons, such as diethylbenzenes, ethyltoluenes, methyl propyl benzenes, methyl isopropyl benzenes, etc., or other isomeric aromatic compounds such as cresols, etc.

Commercial fractions of isomers may be used as a feed material in the present process. For example, xylene fractions from petroleum sources, coke-oven light oil, drip oil or the like may be advantageously treated. Suitable fractions of isomeric aromatic compounds may be obtained from mixtures by fractional distillation and/or extraction with solvents capable of effecting a separation of aromatic compounds from paraffinic hydrocarbons. Preferably, the fractions to be treated are substantially completely aromatic compounds and especially closely-boiling fractions of isomeric aromatic hydrocarbons. Such compounds when associated with non-aromatic compounds, such as paraffins, can be obtained as pure aromatic mixtures by treating with solvents to substantially completely dissolve the aromatic compounds, and subsequently freeing the aromatic compounds from the solvent in a separated extract phase. Thus, a fraction containing the isomeric aromatic compounds and non-aromatic compounds may be treated with such solvents as liquid $SO_2$, furfural, aqueous phenol, liquid hydrofluoric acid with boron fluoride, and the like. It is especially advantageous to employ liquid mixtures of HF and $BF_3$ under conditions, including a high ratio of said liquid mixture to aromatics, to dissolve substantially all the aromatics from said fraction, since by correlating the temperature, contact time, proportion of subsequently added selectivity promotor, such as a low-boiling n-paraffin and the like, with an intermediate partial separation of HF and $BF_3$ from the primary extract, a cyclical interdependent process including the steps of preferential extraction of an isomeric aromatic compound or compounds can be effected.

On the other hand, a fraction containing isomeric aromatic compounds and non-aromatics can be treated in accordance with the present invention to preferentially absorb an aromatic isomer or isomers, leaving a mixture of aromatics and non-aromatics in a raffinate, and subsequently separating said raffinate with a solvent under conditions to effect substantially complete dissolution of said remaining aromatic compounds.

Suitable mixtures of isomeric aromatic compounds may be prepared in various ways, such as by catalytic alkylation of aromatic compounds with olefins, e. g., ethylene, propylene, butylene, etc. Especially effective in combination with the preferential extraction steps is alkylation of an aromatic compound with an olefin by means of a mixture of HF and $BF_3$ under suitable conditions. Thus, for example, HF, $BF_3$ can be used to catalyze the alkylation of toluene with propylene to produce a mixture of cymenes, which mixture without removal therefrom of the HF, $BF_3$ alkylation catalyst can be separated into its component isomers by correlating the ratio of cymenes to HF and $BF_3$ in liquid form in accordance with the preferential absorption steps herein described.

In some cases, it will be more efficacious to prefractionate the isomeric mixtures, whereby a separation of one isomer from the remainder may be obtained; in other cases, it may be more convenient or desirable to separate one of the products of HF, $BF_3$ treatment into its components by fractional distillation. Thus, a xylene oil containing all three xylenes may be first fractioned to separate o-xylene, whereby there is obtained a mixture consisting primarily of meta- and para-xylenes along with some impurities such as ethylbenzene, which mixture may then be treated with liquid HF, $BF_3$ to preferentially absorb m-xylene. In this manner, substantially pure m-xylene can be obtained from the extract phase and substantially pure p-xylene from the raffinate phase. Also, a broader boiling range xylene fraction containing all three xylenes may be first treated with HF, $BF_3$ to absorb meta-xylene, and the raffinate therefrom fractionally distilled to separate or concentrate the ortho and para-xylenes.

Although the process can be beneficially used to treat isomeric aromatic mixtures generally, the present invention will be hereinafter specifically referred to the preferred xylenes as illustrations for purposes of clarity and simplicity only.

The liquid mixture of HF and $BF_3$, which acts as the solvent or absorbent, may contain from about 1% to 70% by weight of $BF_3$, depending on other conditions of temperature, contact time, and amount of solvent, and whether simultaneous isomerization is desired. Ordinarily, from 10–50% $BF_3$ in the liquid HF, $BF_3$ mixture is preferred for preferential absorption of m-xylene from xylene mixtures. The amount of liquid HF, $BF_3$ mixture employed is at least sufficient to form two phases on settling. The ratio of HF, $BF_3$ liquid to aromatics is equal to or less than that at which the preferentially absorbed aromatic isomer is substantially completely soluble in the HF, $BF_3$ liquid. Ordinarily, only sufficient HF, $BF_3$ liquid is employed to extract no more than about 95% of the preferentially absorbed isomer. In the countercurrent or plural stage extraction systems, this limiting factor may be somewhat exceeded near the raffinate end of the system in order to obtain, for example, high purity p-xylene from a mixture of p- and m-xylenes. However, the point of complete solubility of p-xylene, for example, should not be approached too closely; i. e., less than, and usually appreciably less than, the amount of HF, $BF_3$ which would substantially completely dissolve both p- and m-xylenes should be used.

It is ordinarily preferable to carry out the preferential absorption in the presence of a selectivity promoter or solvent modifier. Suitable agents for this purpose are lower normal paraffins, e. g., propane, butane, pentane, etc., which are preferable, or higher normal paraffins, isoparaffins, naphthenes, or mixtures thereof. Sometimes a light naphtha may be satisfactory. Generally, these added agents are substantially inert under the conditions of preferential absorption, lower temperatures, etc., being used with the more reactive compounds to avoid substantial reaction thereof or absorption in the HF, $BF_3$ liquid. Especially preferred are the modifiers which boil below, or at least different from, the boiling range of the aromatic compounds being separated. In cases where the added selectivity promoters boil in the range of the aromatic compounds being separated, the raffinate resulting from the preferential absorption may be treated with a solvent, preferably HF, $BF_3$ liquid, under conditions to completely dissolve the remaining aromatics in the raffinate to separate said aromatics from the non-aromatic selectivity promoters.

These promoters are used in limited amounts to increase the selectivity of the preferential absorption. Generally a ratio of about 5:1 or less, depending on the conditions employed, between the promoter and aromatic compounds is the maximum, and a ratio of about 1 to 2.5:1 is preferable.

When using a selectivity promoter, as is preferable, the maximum ratio of HF, $BF_3$ liquid to aromatics will depend, in part, upon the nature of the promoter and the amount present, a higher maximum ratio generally being permissible with the larger amounts of promoter. Also, this ratio will depend upon the composition of the HF, $BF_3$ liquid and the amount of preferentially absorbed isomer present in the feed. For example, in continuous countercurrent extraction of an equilibrium mixture of xylene isomers in the presence of a selectivity promoter, the maximum ratio of HF, BF$_3$ liquid to aromatics will be usually on the order of about 3–4:1, a ratio of about 2–3 being most desirable; and in the absence of a selectivity promoter, the ratio of HF, BF$_3$ solvent to aromatics is kept below about 1:1, and preferably below about 0.5:1. However, in all cases this ratio should not greatly exceed that value at which the preferentially absorbed isomer is substantially completely soluble in the HF, BF$_3$ solvent. On the other hand, sufficient HF, BF$_3$ liquid is used to obtain a liquid HF, BF$_3$ phase on settling, for example, by using a ratio above about 0.1:1.

In plural stage systems, both the ratio of HF, BF$_3$ liquid to aromatics and the ratio of solvent modifier to aromatics may be advantageously varied as between the stages to increase the selectivity of absorption and/or the purity of raffinate or extract phase. Likewise, in column extraction, either concurrent or countercurrent, multiple injection of HF, BF$_3$ and/or selectivity promoter together with raffinate and extract recycles may be used. Pressure variations between the absorption zones may also be employed.

The temperature at which the contact between the aromatic compound and the liquid HF, BF$_3$ mixture is carried out will ordinarily range from about 0°–150° F. more or less, depending upon the proportion of HF and BF$_3$ in their liquid mixture, the amount of solvent employed, the contact time, nature of the aromatic compound, the result desired, etc. Where a minimum of side reactions are desired, the lower temperatures such as 30°–80° F. are generally preferred. Cooling may be desirable since heat is evolved by absorption of xylenes in HF, BF$_3$ liquid. Sufficient pressure is employed to maintain the HF in liquid form and the desired concentration of BF$_3$ in the HF, BF$_3$ liquid. Since the total amount of BF$_3$ introduced into the absorption zone depends upon the equilibrium pressure of BF$_3$ at the temperature employed, the ratio of liquid HF, BF$_3$ to aromatics, and the gas space above the liquid mixture, sufficient pressure, such as 100–400 lbs. per square inch of BF$_3$, is used to maintain the desired concentration of BF$_3$ in the liquid HF, BF$_3$ mixture. For example, a total of about 56.6% BF$_3$ based by weight on the HF, BF$_3$ mixture was introduced into a contactor under about 345 lbs. per square inch total gauge pressure and containing 1.68 liters of liquid at 100° F. and 3.12 liters of gas space at 120° F., giving a BF$_3$ partial pressure of about 278 lbs. per square inch absolute and about 43 weight percent of BF$_3$ in the HF, BF$_3$ liquid.

The isomeric mixture is contacted with the liquid HF, BF$_3$, preferably with vigorous agitation, for a sufficient period to attain the desired extent of absorption in the solvent. The contacting may suitably be carried out batchwise or continuously or in several stages, and for this purpose combinations of mechanically driven agitators, such as turbo mixers with settlers used either singly or in series or parallel, columns adapted for countercurrent or concurrent flow, coil reactors fitted with mixing jets, or the like, may be used. Since desirable short contact times are attained by thorough contact, it is preferred to use contacting devices, such as turbo mixers or other relatively high speed agitator and baffle arrangements, wherein the HF, BF$_3$ liquid is quickly and finely dispersed throughout the aromatic compounds. Contact time, in correlation with other conditions including thoroughness of contact, will generally range from about 1 minute to 1 hour, more or less; for xylene separations, using vigorous agitation and mild temperature, a period of 1 to 30 minutes is usually satisfactory.

The extraction is carried out under substantially anhydrous conditions and for this purpose dry feed and solvent are used.

After the absorption step and separation of the phases formed on settling, the raffinate or unabsorbed phase, as well as the extract phase or enriched solvent, is treated to remove HF and BF$_3$ from the aromatic compounds. This removal may be brought about, particularly with the raffinate, by pressure reduction and/or heating or by stripping with an inert gas such as a gaseous paraffin, e. g., ethane, propane, etc., nitrogen, CO$_2$, etc. Preferably, easily-condensible gases, such as propane, butane, and the like are employed to facilitate the subsequent separation of HF and BF$_3$ from the stripping medium. To remove HF and BF$_3$ from the extracted or absorbed aromatic compounds, it is sometimes necessary to apply heat thereto in order to break the loose chemical complex formed between the HF and BF$_3$ and the aromatic compound.

After absorptive separation through one or more stages, the raffinate or extract may be further treated, such as by recycle through at least one contacting stage, which may be operated in the higher end of the temperature range, whereby the liquid HF, BF$_3$ simultaneously acts as an isomerization catalyst to produce more of the depleted isomer or isomers. Alternately, for the same purpose, there may be interposed in the recycle stream a separate isomerization stage, using as an isomerization catalyst: HF, BF$_3$ mixtures or other suitable catalytic agents, such as aluminum chloride, aluminum chloride-HCl mixtures, solid phosphoric acid on kieselguhr catalysts. It is an especially advantageous feature of the present invention to combine with the preferential absorption steps an isomerization of the unwanted isomer or isomers by means of HF, BF$_3$ mixtures. Particularly effective is the combination of recycling the unwanted isomer or isomers to a simultaneous isomerization and selective absorption stage employing an HF, BF$_3$ liquid under isomerization conditions. Suitable temperatures for isomerization generally range from about 125° F. to about 250° F. or more; depending in part upon the compound being isomerized; the lower temperatures consistent with the extent of isomerization desired are preferred. For example, when it is desired to obtain m-xylene as the main product, an isomeric xylene mixture may be contacted with liquid HF, BF$_3$ at a temperature of about 175–225° F., whereby p-xylene and, if present, o-xylene, including that recycled from the raffinate obtained from the absorption, are isomerized to produce m-xylene. For the same purpose of obtaining m-xylene, the absorption of m-xylene in HF, BF$_3$ liquid may be carried out at low temperatures, such as 30–80° F., and the p- and o-xylenes remaining in the raffinate isomerized in a separate zone before recycle to the absorption step. Thereby substantially complete conversion to m-xylene may be obtained. In a like manner, p- or o-xylene may be the main product by recycling the undesired xylene isomers.

The practice of the present invention and its advantages will be more fully understood in the following description taken in reference to the drawings. For the sake of simplicity and clarity there have been omitted from the drawing certain details such as pumps, valves, pressuring means, coolers, heat exchangers, etc., as will be readily supplied by one skilled in the art. It is also evident that the materials forming the treating apparatus, especially that portion in contact with large concentrations of HF and BF₃, is preferably substantially inert, such as Monel, nickel, Hastalloy, etc., so that no reaction of HF and/or BF₃ takes place with the apparatus material to form excessive amounts of contaminants or substances inhibiting the carrying out of the present process.

Referring to Figure 1, the separating system comprises a series of contacting stages 1, 2, 3, 4, 5 and 6, together with their respective settlers 11, 12, 13, 14, 15 and 16. Suitably, each contacting stage may be a turbomixer. A dried feed material such as a xylene oil containing all of the isomeric xylenes is introduced through line 20 into stage #1. Preferably, a diluent or selectivity promoter, such as liquid pentane, is also introduced in to stage 1 along with the xylene feed. Simultaneously in the continuous system, a liquid HF, BF₃ of the desired composition is fed through line 21 into stage 1 at a rate giving a proper ratio to the xylene mixture, such as about 1.5:1 volume ratio. Where no appreciable chemical reaction such as isomerization is desired the temperature may be maintained at about 30-80° F., such as for example at about 70° F.

After a contact time of about 15 minutes in stage 1 at this temperature, the diphasic mixture is withdrawn through line 22 into a settler 11, wherein a separation of the phases takes place. The separated heavier HF, BF₃ liquid or extract phase is withdrawn through line 23 for subsequent removal of HF, BF₃ therefrom to yield a xylene fraction enriched in the preferentially absorbed isomer, such as m-xylene. The separated upper hydrocarbon phase containing the selectivity promoter, when used, is passed through line 25 to contacting stage 2.

The feed into stage 2 may contain in addition to the first stage raffinate the extract phase from the succeeding stage 3 via line 26 and further quantities of HF and/or BF₃ through line 27, if desired to obtain optimum HF, BF₃ liquid composition and ratio to xylene. The effluent from stage 2 is conducted through line 28 to settler 12 and therein is separated into raffinate and extract phases which are withdrawn through lines 29 and 30, respectively. When feeding an equilibrium mixture to stage 1, it is preferable not to introduce also second stage extract into the first stage but rather to discharge said second stage extract via line 30 for removal of HF and BF₃ to produce an enriched fraction. Under different circumstances, however, the second stage extract may be brought into the first contacting stage 1. In such case and others, it may be more desirable to introduce the feed material to the separation system at an intermediate stage.

In a manner similar to stage 2, the feed to each of stages 3, 4, 5 and 6 will comprise the raffinate from the preceding stage (via lines 29, 35, 36 and 37, respectively), the extract phase from the succeeding stage except the last stage 6 (via lines 40, 41 and 42 respectively) and, if desired, makeup HF and/or BF₃ (via lines 45, 46, 47 and 48, respectively). Effluent lines 51, 52, 53 and 54, respectively, are provided to discharge from the contacting stages 3 to 6 to their respective settlers 13 to 16.

The final raffinate withdrawn from settler 16 through line 55 will contain the paraffinic selectivity promoter, which can be subsequently removed, and will be substantially free of the preferentially absorbed isomer, e. g., m-xylene.

Figure 2:
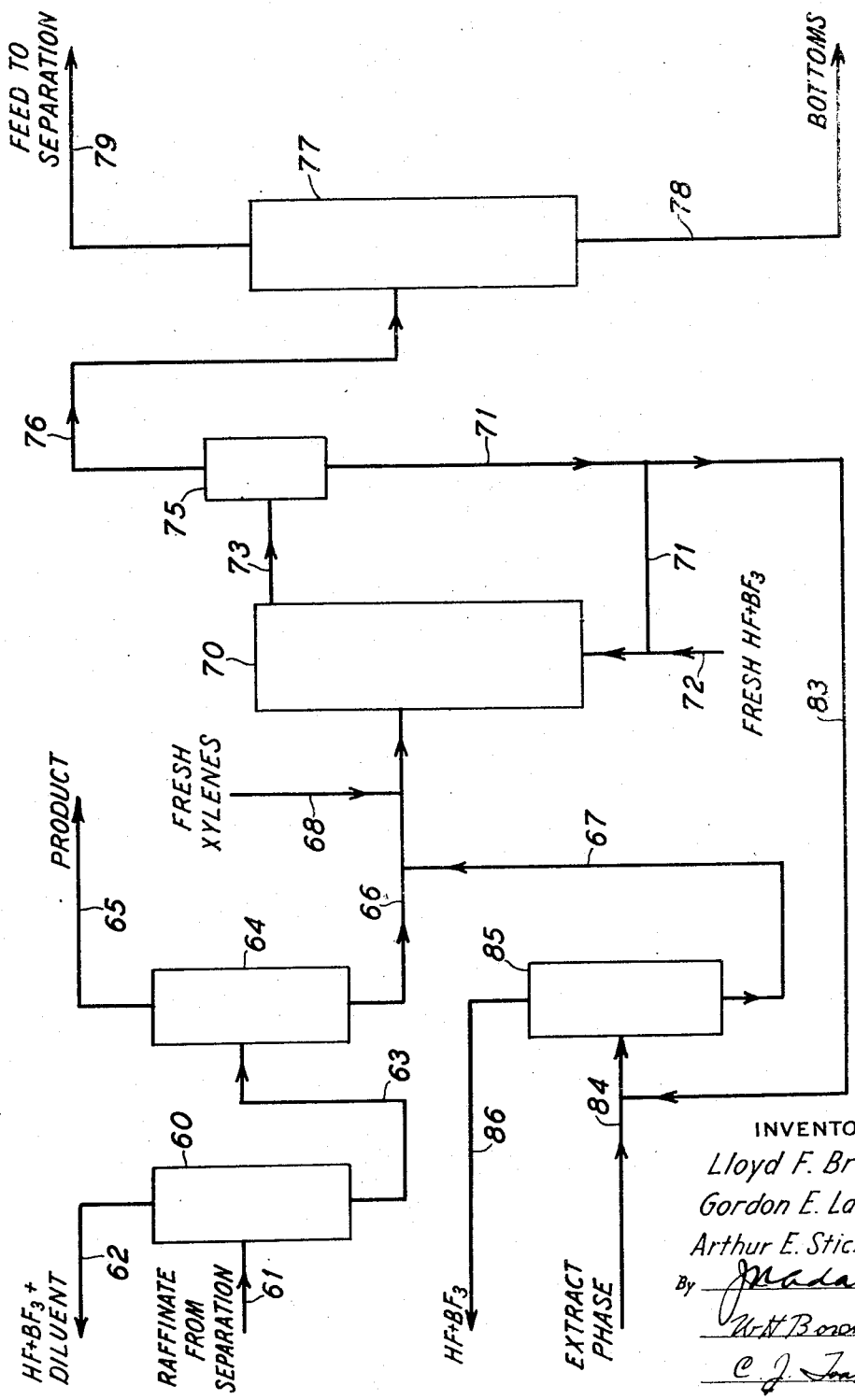
Figure 2 is a schematic flow diagram, illustrating an extract regeneration and isomerization system.

Referring to Figure 2 of the drawings, for suitable combination with the separation system, there may be provided a prefractionator 60 into which, for example, the final raffinate from line 55 (Fig. 1), may be fed through line 61. Therein selectivity promoter, such as liquid pentane, if present, and residual HF and BF₃ together with low boiling aromatics such as benzene and toluene may be separated from the desired aromatic compounds and withdrawn through line 62. This stream may be desirably recycled to the separation system and may be introduced, for example, through line 20 with the feed to contacting stage 1. From the fractionator 60 the remaining aromatic compounds may pass through line 63 to a rerun still 64, wherein, in the case of xylene mixtures, substantially pure p-xylene may be taken overhead as product through line 65, and o-xylene withdrawn through line 66.

This o-xylene stream may be combined with other undesired xylenes, such as, for example, a m-xylene fraction from conduit 67, and, if desired, other xylene mixtures from line 68 to form a combined xylene feed to isomerization contactor 70. Recycle HF, BF₃ from line 71 together with fresh HF and/or BF₃ via line 72 is introduced into the contactor 70 to provide the catalyst for the isomerization. Suitable conditions, such as a temperature of about 200° F., a contact time of about 15 minutes, and sufficient agitation, as may be provided by using a turbomixer or the like as the contactor, are maintained in the contactor 70 to obtain the desired isomerization. Discharging via line 73, the diphasic mixture of isomerization product and HF, BF₃ liquid is separated in settler 75, the HF, BF₃ liquid being recycled in part, if desired, as indicated. The whole (as shown) or only part of the isomerization product may be passed through line 76 to a fractionator 77 for removal of the small amount of heavier compounds formed during isomerization. These heavier compounds are withdrawn as bottoms through line 78, and the overhead, which may be an equilibrium mixture of the isomeric xylenes, withdrawn through line 79 for use as feed to the separation system shown in Figure 1.

Part of the HF, BF₃ liquid separated in the settler 75 from the isomerization product and which liquid may contain absorbed xylenes, depending in part upon the composition of said liquid, may be taken through line 83 and combined in line 84 with other extract phases, such as those obtained from lines 23 and 30 in the system of Figure 1, to form a feed stream to an HF, BF₃ regenerator 85. Suitable conditions, including temperatures and pressures as low as possible, are employed in the regenerator 85 to obtain substantially complete removal of HF and BF₃ through line 86. The remaining aromatic compounds, e. g., xylenes which are predominately m-xylene, in the arrangement indicated, may be passed to the isomerization contactor 70 through line 67 as mentioned hereinabove.

It will be readily apparent that various modifications and/or changes in the above-described illustrative treating system may be made without departing from the spirit of the present invention. Thus, instead of six contactors in series, as shown, one or more contactors and as high as eight to ten contactors in series of the same or different types may be sometimes advantageously used. Further, as indicated hereinabove, the contactors may be operated at higher temperatures or with varied percentages of $BF_3$ in the liquid HF, $BF_3$ solvent whereby in addition to absorption there is simultaneously obtained an isomerization of the xylenes.

By way of illustration of the combined systems of Figures 1 and 2 and any part thereof, the following is given:

A xylene mixture containing 17% o-xylene, 63% m-xylene, and 20% p-xylene (percentages are by volume) at a rate of 4460 B/D (barrels per day) and liquid n-pentane at a rate of 11130 B/D are introduced through line 20 into contacting stage 1. Simultaneously 4470 B/D of anhydrous hydrofluoric acid and 620,000 lbs. per day of boron fluoride are introduced into stage 1, and substantially the same amounts of HF and $BF_3$ together with 1737 B/D of extract are withdrawn from settler 11 through line 23.

Raffinate from first stage settler 11 is passed through line 25 to stage 2 at a rate of 2723 B/D of xylenes in addition to n-pentane. Make-up HF, $BF_3$ mixture is introduced through line 27 at a rate of 630 B/D of HF and 93,000 lbs./D of $BF_3$. Discharging from second stage settler 12 through line 30 is 4340 B/D of HF, 550,000 lbs./D of $BF_3$, and 1540 B/D of extract.

The rates of flow in the remaining streams in the subsequent stages are as follows:

*Raffinates (xylene portion)*

Stage 2. In line 29: 2473 B/D
Stage 3. In line 35: 2265 B/D
Stage 4. In line 36: 1990 B/D
Stage 5. In line 37: 1597 B/D
Stage 6. In line 55: 1182 B/D

*Extract Phases (recycled to preceding stage)*

| Stage | HF (B/D) | $BF_3$ (Lbs./D) | Xylenes (B/D) |
|---|---|---|---|
| #3 (In line 26) | 3,710 | 457,000 | 1,290 |
| #4 (In line 40) | 3,235 | 393,000 | 1,082 |
| #5 (In line 41) | 2,665 | 294,000 | 808 |
| #6 (In line 42) | 1,730 | 155,000 | 415 |

*Make-up HF, $BF_3$*

| Stage | HF (B/D) | $BF_3$ (Lbs./D) |
|---|---|---|
| #3 (via line 45) | 475 | 64,000 |
| #4 (via line 46) | 570 | 99,000 |
| #5 (via line 47) | 930 | 139,000 |
| #6 (via line 48) | 1,730 | 155,000 |

The compositions of the various xylene fractions in the raffinate and extract phases from each stage are given in the following table:

*Composition, volume percent*

| Stage | 1 | 2 | 3 | 4 | 5 | 6 |
|---|---|---|---|---|---|---|
| Raffinate: | | | | | | |
| o-xylene | 24.6 | 25.4 | 27.2 | 30.4 | 46.8 | 44.8 |
| m-xylene | 48.7 | 44.7 | 40.7 | 33.8 | 20.0 | 2.5 |
| p-xylene | 27.7 | 29.9 | 32.1 | 35.8 | 43.2 | 52.7 |
| Extract: | | | | | | |
| o-xylene | 6.7 | 7.1 | 7.5 | 8.0 | 9.1 | 13.8 |
| m-xylene | 85.5 | 84.6 | 83.7 | 82.5 | 79.5 | 70.0 |
| p-xylene | 7.8 | 8.3 | 8.8 | 9.5 | 11.4 | 16.2 |

The final raffinate from line 55 (Fig. 1) may be introduced at the same rate, through line 61 (Fig. 2) into prefractionator 60, wherein 11130 B/D of n-pentane along with some HF and $BF_3$ are taken overhead through line 62 for recycle to contacting stage 1. The bottoms taken through line 63 to rerun still 64 are separated into an overhead stream of 650 B/D of 95.2% p-xylene and a bottom stream of 530 B/D of o-xylene.

The m-xylene enriched extract phases from lines 23 and 30 (Fig. 1) may be combined into a stream consisting of 3277 B/D of 85.1% m-xylene, 9110 B/D of HF and 1,170,000 lbs./D of $BF_3$, which stream forms via line 84 (Fig. 2) part of the feed to regenerator 85. Therein the HF and $BF_3$ are substantially completely removed from the extract phase, leaving as bottoms in line 67 a m-xylene enriched fraction which is combined with the above-mentioned o-xylene stream and, if desired, for example, 652 B/D of fresh xylenes (via line 68) of the same composition as in line 20 (Fig. 1). This combined xylene mixture is introduced into isomerization contactor 70 under the following conditions: 0.3 vol. HF per volume of xylenes, 0.03 part by weight of $BF_3$ per part of HF (as charged), 15 minutes contact time, and 200° F.

The resulting isomerized mixture and HF, $BF_3$ liquid are separated in settler 75, from whence 4460 B/D of equilibrium xylenes as raffinate through line 16 may be fed directly to separation stage 1 (Fig. 1). The separated HF, $BF_3$ liquid phase may be partly recycled together with fresh HF and/or $BF_3$ to contactor 70 and partly to regenerator 85 as indicated.

Figure 3:
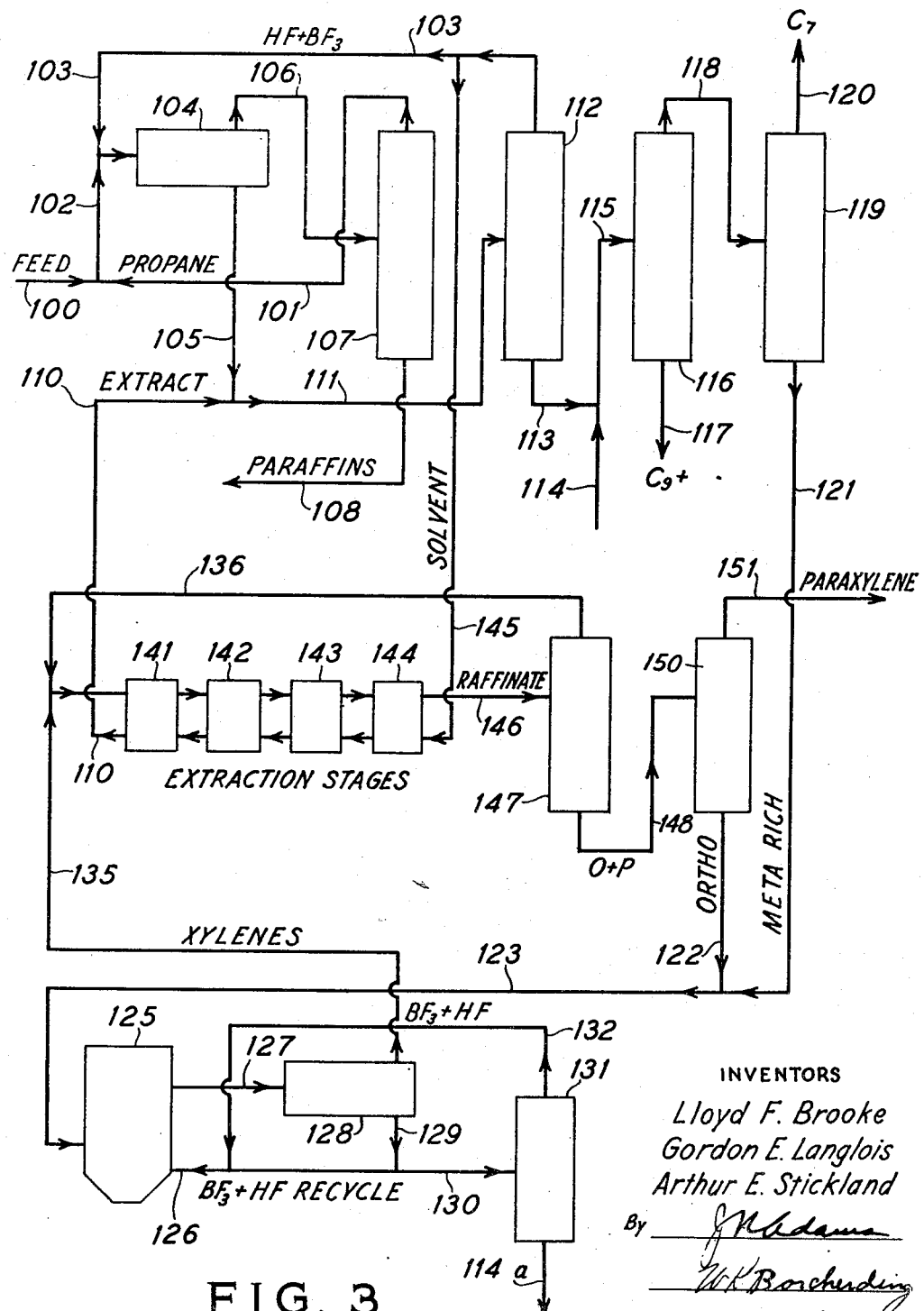
Figure 3 is an alternative combined system shown schematically.

In Figure 3 is shown an alternative arrangement of a complete system, including feed preparation, preferential extraction, and isomerization. Therein a dried mixture of isomeric aromatics and paraffins from line 100 are combined, if desired, with a liquid diluent such as propane from line 101, the diluted mixture in line 102 being mixed with HF, $BF_3$ liquid via line 103 to serve as feed to an extraction zone 104. Therein a substantially complete separation of aromatics from paraffins is obtained, the aromatics being withdrawn via line 105 in an extract phase, and the paraffins remaining undissolved as raffinate in the effluent line 106. When a diluent such as propane is used, the raffinate is passed to a propane recovery column 107, whereby propane is recycled through line 101 and paraffins discharged through line 108.

The HF, $BF_3$ liquid solution of aromatics in line 105 may be combined with other extract phases, such as via line 110, and then passed through line 111 to a solvent regenerator 112, wherein HF, $BF_3$ taken overhead is recycled after condensation (not shown) partly through line 103. The remaining aromatics issuing from regenerator 112 through line 113 may be combined with other extracted aromatics, such as via line 114. This mixture may be all (as shown), or only partly, fractionated to remove higher and lower boiling impurities. For example, in case of isomeric xylenes, the mixture may be passed through line 115 to a column 116 in which $C_9$'s and heavier are discharged as bottoms through line 117. The overhead material passes through line 118 to a second fractionator 119 for removal of the lighter boiling materials, such as $C_7$'s through line 120. The bottoms in line 121 comprise the purified isomeric xylene feed to the isomerization and preferential absorption parts of the system, which feed may be purified and prepared in other ways. Due to the addition of extracts via lines 110 and 114, this mixture is enriched with m-xylene. (For clearness, the xylenes will be used hereinafter as an example of treatment of isomeric aromatic compounds.)

The meta-xylene enriched fraction in line 121 is combined with an ortho-xylene stream in line 122 to form the charge via line 123 to isomerization contactor 125. Therein the xylenes are contacted with a suitable catalyst such as HF, BF₃ liquid introduced via line 126 and under conditions conducive to produce an equilibrium mixture of the xylene isomers. The reaction mixture is led through line 127 to a settler 128, wherein the liquid HF, BF₃ is settled out and withdrawn through line 129. Part of the HF, BF₃ is recycled through line 126 to the isomerization contactor 125 and part is passed through line 130 to an HF, BF₃ regenerator 131. HF, BF₃ is taken overhead from regenerator 131 and recycled through line 132 to isomerization contactor 125. The bottoms from regenerator 131 form an extract passing through line 114a and line 114 into the C₉ removal column 116.

The upper phase in settler 128 comprises an equilibrium mixture of xylene isomers and is passed via line 135 to a series of preferential extraction stages after admixture with a selectivity promotor, such as liquid propane, via line 136. The propane-xylene mixture passes through the extraction stages 141, 142, 143, and 144 countercurrent to liquid HF, BF₃ solvent entering through line 145. Ordinarily three stages will be sufficient for complete separation of meta-xylene from para- and ortho-xylene; however, since a fourth stage would probably be provided in a plant for safety, four stages are shown here. The final extract—mainly meta-xylene—passes through line 110 to the HF, BF₃ regenerator; the final raffinate passes through line 146 to a propane recovery column 147, from which propane is recycled through line 136 and appropriate condensers (not shown). The remaining propane-free mixture of ortho- and para-xylenes is taken through line 148 to a column 150, wherein substantially pure para-xylene is taken overhead through line 151 and substantially pure ortho-xylene is discharged through line 122 as bottoms.

In the above description of Figure 3, many variations may be made; the representation is schematic; and various details such as condensers, etc., will be readily supplied by one skilled in the art. For example, with some isomeric aromatic compounds, such as cymenes, HF alone may be used as the isomerization catalyst.

To illustrate further the present invention, several experiments were carried out in a Monel stirrer, to which the reactants were charged in batch. After the desired contact time at a controlled temperature, the mixture of aromatic compounds and HF, BF₃ liquid was withdrawn and allowed to stratify. The lower HF, BF₃ phase was diluted with water and extracted with pentane. The pentane extract was water washed and the pentane removed by distillation. The raffinate and extract, as well as a composite product obtained by combining the portions of the raffinate and extract in the ratio of their volumes, were fractionated and the cuts therefrom subjected to ultra-violet analysis.

*Example A.*—A xylene charge oil was contacted with a liquid HF, BF₃ mixture containing 43 weight percent BF₃ and the remainder HF at 100° F. for 15 minutes. The volume ratio of HF, BF₃ liquid to xylenes was about 1.5:1. Isobutane was added at a volume ratio to xylenes of 2.4:1. There was obtained 39.1% of stabilized (isobutane-free) raffinate and 52.5% of extract, based by volume on the xylenes charged. The results were as follows, wherein the values are on the basis of volumes per 100 volumes of xylenes charged and corrected to 100% recovery:

| Components | Charge | Composite Product | Raffinate | Extract | Ratio of isomer in extract to isomer in raffinate |
|---|---|---|---|---|---|
| Benzene | | 5.6 | 4.9 | 0.7 | |
| Toluene | | 2.0 | 1.7 | 0.3 | |
| Ethylbenzene | 13.6 | 3.2 | 2.4 | 0.8 | |
| o-xylene | 15.2 | 9.1 | 5.6 | 3.5 | 0.63 |
| m-xylene | 49.2 | 44.7 | 12.2 | 32.5 | 2.66 |
| p-xylene | 22.0 | 14.7 | 12.1 | 2.6 | 0.22 |
| Heavier Hydrocarbons | | 20.3 | 3.8 | 16.5 | |

*Example B.*—Another xylene oil was contacted with a liquid HF, BF₃ mixture containing 39 weight percent BF₃ at 70° F. for 5 minutes with a volume ratio of HF, BF₃ liquid to xylenes of about 0.5:1, yielding 49.9 volume percent raffinate and 38.2 volume percent extract, as follows (the values having the same basis as in Example A):

| Components | Charge | Composite Product | Raffinate | Extract | Ratio of isomer in extract to isomer in raffinate |
|---|---|---|---|---|---|
| Benzene | | 0.5 | | 0.5 | |
| Toluene | | | | | |
| Ethylbenzene | 15.1 | 9.9 | 6.8 | 3.1 | |
| o-xylene | 13.2 | 16.7 | 12.0 | 4.7 | 0.39 |
| m-xylene | 48.0 | 42.0 | 19.3 | 22.7 | 1.17 |
| p-xylene | 24.7 | 23.6 | 16.6 | 7.0 | 0.42 |
| Heavier Hydrocarbons | | 7.3 | 1.9 | 5.4 | |

*Example C.*—At a volume ratio of HF, BF₃ liquid to xylenes of 0.5:1, a xylene oil was contacted for 15 minutes at 100° F. with a liquid HF, BF₃ mixture containing 37 weight percent of BF₃. The results follow (the same basis being used as in Example A):

| Components | Charge | Composite Product | Raffinate | Extract | Ratio of isomer in extract to isomer in raffinate |
|---|---|---|---|---|---|
| Ethylbenzene | 2.1 | 2.1 | 1.6 | 0.5 | |
| o-xylene | 3.1 | 4.7 | 3.1 | 1.6 | 0.52 |
| m-xylene | 80.6 | 76.3 | 50.8 | 25.5 | 0.50 |
| p-xylene | 14.2 | 14.6 | 11.5 | 3.1 | 0.27 |
| Heavier hydrocarbons | | 2.4 | 1.0 | 1.4 | |

*Example D.*—A liquid mixture containing 49 weight percent BF₃ and the remainder HF was used to treat a xylene oil in a volume ratio of 1.9:1 for 15 minutes at 100° F., in the presence of n-pentane in a volume ratio of xylenes of 2.5:1. The pentane-free raffinate obtained amounted to 31.0 volume percent and the extract 45.6 volume percent, based on the charged xylenes. The analyses follow (the basis being the same as in Example A):

| Components | Charge | Composite Product | Raffinate | Extract | Ratio of isomer in extract to isomer in raffinate |
|---|---|---|---|---|---|
| Ethylbenzene | 14.5 | 6.5 | 6.5 | | |
| o-xylene | 14.5 | 7.9 | 4.8 | 3.1 | 0.64 |
| m-xylene | 46.2 | 46.4 | 6.8 | 39.6 | 5.81 |
| p-xylene | 24.8 | 15.9 | 12.8 | 3.1 | 0.24 |
| Heavier Hydrocarbons | | 14.6 | 0.9 | 13.7 | |

*Example E.*—For 15 minutes at 100° F. a xylene oil was contacted with a liquid HF, BF₃ mixture containing 26 weight percent BF₃ in a volume ratio of HF, BF₃ liquid to xylenes of 0.5:1, whereby 77.1 volume percent of raffinate and 16.2 volume percent extract, based on xylenes charged, were obtained. These analyzed as follows (the values having the same basis as in Example A):

| Component | Charge | Composite Product | Raffinate | Extract | Ratio of isomer in extract to isomer in raffinate |
|---|---|---|---|---|---|
| Ethylbenzene | 2.1 | | | | |
| o-xylene | 93.2 | 80.1 | 72.2 | 7.9 | 0.11 |
| m-xylene | 4.0 | 16.1 | 8.9 | 7.2 | 0.81 |
| p-xylene | 0.7 | 1.8 | 1.6 | 0.2 | 0.13 |
| Heavier hydrocarbons | | 2.2 | 0.0 | 2.2 | |

*Example F.*—A xylene oil was contacted with a liquid HF, BF₃ mixture containing 27 weight percent BF₃ at 76–78° F. for 5 minutes with a volume ratio of HF, BF₃ liquid to xylenes of about 1.3:1 and in the presence of 2.5 volumes of liquid propane per volume of xylenes. The total gauge pressure was 236 lbs. per square inch. The results were as follows (in this and the following examples, the values given are based on 100% recovery and are percentages by volume of each product):

| | Charge | Composite Product | Raffinate | Extract |
|---|---|---|---|---|
| Vol. Per Cent of Charge | | | 62.9 | 37.1 |
| Components: | | | | |
| Toluene | | 0.2 | | 0.6 |
| Ethylbenzene | | 0.3 | 0.5 | |
| o-xylene | 18.4 | 18.0 | 24.6 | 6.8 |
| m-xylene | 60.1 | 56.9 | 41.1 | 83.7 |
| p-xylene | 21.5 | 23.3 | 33.8 | 5.5 |
| Heavier hydrocarbons | | 1.3 | | 3.4 |

It will be noted that there can be separated by distillation from the above extract a fraction containing 94 parts of m-xylene and 6 parts of p-xylene.

*Example G.*—A xylene fraction was treated with an HF, BF₃ liquid containing 30 weight percent of BF₃ for 5 minutes at 75–78° F. in the presence of 2.5 parts of liquid propane per part of xylenes under a total pressure of 218 lbs. gauge. The ratio of HF, BF₃ liquid to xylenes was 1.3:1. The treatment gave the following results:

| | Charge | Composite Product | Raffinate | Extract |
|---|---|---|---|---|
| Vol Per Cent of Charge | | | 59.3 | 40.7 |
| Components: | | | | |
| Toluene | | 0.1 | | |
| Ethylbenzene | 0.1 | | | |
| o-xylene | 10.2 | 10.9 | 15.4 | 4.4 |
| m-xylene | 79.1 | 75.4 | 66.0 | 89.0 |
| p-xylene | 10.6 | 12.2 | 18.6 | 2.9 |
| Heavier hydrocarbons | | 1.4 | | 3.4 |

A fraction containing 97% m-xylene and 3% p-xylene can be separated from the extract by fractional distillation.

*Example H.*—A xylene mixture was extracted with an HF, BF₃ liquid containing 21 weight percent of BF₃ at a ratio of HF, BF₃ liquid to xylene of 1.2:1 and with 2.5 volumes of added liquid propane per volume of xylenes under a pressure of 315 lbs. per square inch gauge for 5 minutes at 74–77° F. The results were as follows:

| | Charge | Composite Product | Raffinate | Extract |
|---|---|---|---|---|
| Vol. Per Cent of Charge | | | 74.1 | 25.9 |
| Components: | | | | |
| Toluene | | | | 0.2 |
| Ethylbenzene | 0.3 | | | |
| o-xylene | 39.3 | 34.9 | 42.6 | 13.2 |
| m-xylene | 12.7 | 20.5 | 2.8 | 71.1 |
| p-xylene | 47.7 | 43.3 | 54.6 | 10.7 |
| Heavier hydrocarbons | | 1.2 | | 4.8 |

Fractions separated by distillation from the extract and raffinate may contain 86% m-xylene and 14% p-xylene, and 4.9% m-xylene and 95.1% p-xylene, respectively.

*Example I.*—A mixture of 1 volume of xylenes and 1 volume of liquid n-pentane was thoroughly contacted for 5 minutes at 75–77° F. with 0.7 volumes of HF, BF₃ liquid containing 26 weight percent of BF₃ and under 149 lbs. gauge pressure, yielding the following results:

| | Charge | Composite Product | Raffinate | Extract |
|---|---|---|---|---|
| Vol. Per Cent of Charge | | | 72.3 | 27.7 |
| Components: | | | | |
| Toluene | | 0.1 | | 0.3 |
| Ethylbenzene | | 0.3 | | 1.3 |
| o-xylene | 18.4 | 18.2 | 23.2 | 5.3 |
| m-xylene | 60.1 | 58.8 | 49.0 | 83.9 |
| p-xylene | 21.5 | 22.3 | 27.8 | 8.1 |
| Heavier hydrocarbons | | 0.3 | | 1.1 |

*Example J.*—A mixture of 1 volume of xylenes and 1 volume of liquid n-pentane was thoroughly contacted for 5 minutes at 74–78° F. with 0.8 volumes of HF, BF₃ liquid containing 48 weight percent of BF₃ and under 322 lbs. gauge pressure, yielding the following results:

| | Charge | Composite Product | Raffinate | Extract |
|---|---|---|---|---|
| Vol. Per Cent of Charge | | | 61.6 | 38.4 |
| Components: | | | | |
| Toluene | | 0.3 | | 0.9 |
| Ethylbenzene | | 2.4 | 3.9 | |
| o-xylene | 18.4 | 16.0 | 21.8 | 7.0 |
| m-xylene | 60.1 | 58.5 | 43.6 | 82.6 |
| p-xylene | 21.5 | 22.4 | 31.0 | 8.5 |
| Heavier hydrocarbons | | 0.4 | | 1.0 |

*Example K.*—A xylene fraction was treated with an HF, BF₃ liquid containing 35 weight percent of BF₃ at a ratio of HF, BF₃ liquid to xylenes of 0.7:1 for 5 minutes at 76–78° F. under 238 lbs.

gauge pressure. With one volume of liquid propane per volume of xylenes present, the results were as follows:

|  | Charge | Composite Product | Raffinate | Extract |
|---|---|---|---|---|
| Vol. percent of Charge | | | 64.6 | 35.4 |
| Components: | | | | |
| Toluene | | 0.3 | | 0.8 |
| o-xylene | 18.4 | 19.3 | 25.1 | 8.8 |
| m-xylene | 60.1 | 57.5 | 45.9 | 78.4 |
| p-xylene | 21.5 | 22.4 | 29.0 | 10.5 |
| Heavier hydrocarbons | | 0.5 | | 1.4 |

*Example L.*—A xylene fraction was treated with an HF, BF₃ liquid containing 34 weight per cent of BF₃ at a ratio of HF, BF₃ liquid to xylene of 0.7:1 for 5 minutes at 76–78° F. under 278 lbs. gauge pressure. With 2.5 volumes of liquid propane per volume xylenes present the following results were obtained:

|  | Charge | Composite Product | Raffinate | Extract |
|---|---|---|---|---|
| Vol. percent of Charge | | | 74.5 | 25.5 |
| Components: | | | | |
| Toluene | | 0.1 | | 0.3 |
| o-xylene | 18.4 | 17.7 | 22.2 | 4.7 |
| m-xylene | 60.1 | 58.4 | 49.5 | 84.2 |
| p-xylene | 21.5 | 23.0 | 28.3 | 7.5 |
| Heavier hydrocarbons | | 0.8 | | 3.3 |

*Example M.*—A mixture of xylenes was treated at 31–35° F. for 5 minutes under 115 lbs. gauge pressure with an HF, BF₃ liquid containing 33 weight per cent of BF₃. With 1.4 parts by volume of HF, BF₃ liquid and 2.5 parts by volume of liquid propane per volume of xylenes, the results were as follows:

|  | Charge | Composite Product | Raffinate | Extract |
|---|---|---|---|---|
| Vol. percent of Charge | | | 47.0 | 53.0 |
| Components: | | | | |
| Toluene | | 0.1 | | 0.2 |
| Ethylbenzene | 0.1 | 0.5 | 1.1 | |
| o-xylene | 18.3 | 17.0 | 28.7 | 6.7 |
| m-xylene | 60.3 | 57.7 | 28.7 | 83.4 |
| p-xylene | 21.3 | 23.6 | 41.5 | 7.7 |
| Heavier hydrocarbons | | 1.1 | | 2.0 |

In comparing the effect of decreased temperature from that used in Example F, it will be noted that an increased absorption is obtained without appreciably changing the selectivity.

The following tabulated examples illustrate the conditions for simultaneous isomerization of one xylene and separation of the resulting isomeric mixtures by means of HF, BF₃ liquid, the starting material being predominately o-xylene in Examples N and O, and m-xylene in Examples P and Q.

| Example No. | N | | | | O | | | |
|---|---|---|---|---|---|---|---|---|
| *Operating Conditions* | | | | | | | | |
| Temp., °F | 150 | | | | 200 | | | |
| Contact time, min | 60 | | | | 60 | | | |
| Press., lbs. gauge | 82 | | | | 132 | | | |
| Approx. Weight percent BF₃ in HF, BF₃ liquid | 20 | | | | 17 | | | |
| Ratio of HF, BF₃ liquid to xylenes | 0.4 | | | | 0.4 | | | |
| Hydrocarbon distribution | Charge | Composite product | Raffinate | Extract | Charge | Composite product | Raffinate | Extract |
| Volume Per Cent of Charge | | | 78.6 | 21.4 | | | 81.6 | 18.4 |
| Toluene | | 0.1 | 0.4 | 0.4 | | 5.5 | 6.3 | 1.8 |
| Ethylbenzene | 0.7 | 0.1 | | 0.4 | 0.7 | | | |
| o-xylene | 90.8 | 43.1 | 47.3 | 27.8 | 90.8 | 19.7 | 21.2 | 12.9 |
| m-xylene | 6.8 | 56.7 | 43.1 | 60.5 | 6.8 | 53.2 | 53.9 | 49.9 |
| p-xylene | 1.7 | 8.7 | 9.6 | 5.1 | 1.7 | 17.2 | 18.6 | 10.8 |
| Heavier hydrocarbons | | 1.3 | | 5.9 | | 4.5 | | 24.7 |

| Example No. | P | | | | Q | | | |
|---|---|---|---|---|---|---|---|---|
| | 1st | 2nd | | | | | | |
| *Operating Conditions* | | | | | | | | |
| Temp., °F | 200–208 | 150 | | | 150 | | | |
| Contact time, min | 10 | 50 | | | 60 | | | |
| Press., lbs. gauge | 139 | 50 | | | 52 | | | |
| Approx. weight percent BF₃ in HF, BF₃ liquid | 14 | | | | About 10–15 | | | |
| Ratio of HF, BF₃ liquid to xylenes | 0.4 | | | | 0.4 | | | |
| Hydrocarbon distribution | Charge | Composite product | Raffinate | Extract | Charge | Composite product | Raffinate | Extract |
| Volume percent of Charge | | | 84.7 | 15.3 | | | 89.7 | 10.3 |
| Toluene | | 0.2 | | 1.3 | | 0.1 | | 1.1 |
| Ethylbenzene | | | | | | | 0.1 | 1.2 |
| o-xylene | 1.2 | 2.7 | 17.0 | 8.6 | 1.2 | 5.1 | 5.6 | 1.1 |
| m-xylene | 98.0 | 64.5 | 63.0 | 73.0 | 98.0 | 86.6 | 86.1 | 90.9 |
| p-xylene | 0.8 | 18.4 | 20.0 | 10.0 | 0.8 | 7.9 | 8.3 | 4.2 |
| Heavier hydrocarbons | | 1.1 | | 7.1 | | 0.1 | | 1.3 |

In Example P above, the temperature was reduced after 10 minutes to 150° F., and Example Q shows that with the HF, BF₃ liquid employed a temperature of 150° F. was insufficient to cause appreciable isomerization of m-xylene.

In another series of experiments, isomerization and separation of isomers were obtained as follows:

| Example No. | R | | | | S | | | | T | | | |
|---|---|---|---|---|---|---|---|---|---|---|---|---|
| *Operating Conditions* | | | | | | | | | | | | |
| Temp., °F | 75–77 | | | | 75–80 | | | | 200 | | | |
| Contact time, min | 5 | | | | 5 | | | | 60 | | | |
| Press., lbs, gauge | 277 | | | | 179 | | | | 112 | | | |
| Approx. weight percent $BF_3$ in HF, $BF_3$, liquid | 24 | | | | 26 | | | | About 2–5 | | | |
| Ratio of HF, $BF_3$ liquid to xylenes (vol.) | 1.3 | | | | 1.3 | | | | 0.4 | | | |
| Diluent | Propane | | | | n-Pentane | | | | None | | | |
| Ratio of diluent to xylenes (Vol.) | 1.0 | | | | 1.0 | | | | | | | |
| Hydrocarbon distribution | Charge | Composite product | Raffinate | Extract | Charge | Composite product | Raffinate | Extract | Charge | Composite product | Raffinate | Extract |
| Vol. percent of Charge | | | 64.5 | 35.5 | | | 61.4 | 38.6 | | | 95.1 | 4.9 |
| Toluene | | | | | | | | | | 0.1 | | 1.3 |
| Ethylbenzene | 0.3 | 1.1 | 1.1 | 1.2 | 0.3 | | | | | 2.2 | 2.3 | 0 |
| o-xylene | 39.3 | 28.3 | 40.6 | 17.2 | 39.3 | 29.0 | 39.3 | 12.6 | 1.2 | 15.6 | 16.0 | 9.3 |
| m-xylene | 12.7 | 26.0 | 5.3 | 63.7 | 12.7 | 34.2 | 9.1 | 74.0 | 98.0 | 62.4 | 62.6 | 58.1 |
| p-xylene | 47.7 | 39.7 | 53.0 | 15.4 | 47.7 | 36.4 | 51.6 | 12.3 | 0.8 | 18.7 | 19.1 | 10.1 |
| Heavier hydrocarbons | | 0.9 | | 2.5 | | 0.4 | | 1.1 | | 1.0 | | 20.0 |

It is readily apparent that various modifications can be made within the spirit of the present invention and scope of the appended claims.

We claim:

1. A process of treating a mixture of isomeric lower dialkyl benzenes which comprises feeding said mixture to a liquid phase extraction zone, selectively extracting a dialkyl benzene composition isomeric to the mixture of dialkyl benzenes in the feed by contacting said feed with a liquid mixture of HF and $BF_3$ in said extraction zone at a temperature not above 100° F., separating a liquid HF and $BF_3$ extract phase containing selectively extracted dialkyl benzenes from a liquid phase containing undissolved isomeric dialkyl benzenes, the ratio of dialkyl benzene isomers in the extract being materially different from the ratio thereof in said original mixture, and recovering said isomeric dialkyl benzenes from the extract phase.

2. A process of treating a mixture of isomeric lower dialkyl benzenes containing from 1 to 3 carbon atoms inclusive in each alkyl group which comprises feeding said mixture to a liquid phase extraction zone, selectively extracting a dialkyl benzene composition isomeric to the mixture of dialkyl benzenes in the feed by contacting said feed with a liquid mixture of HF and $BF_3$ containing in excess of 1% by weight of $BF_3$ in said extraction zone at a temperature not above about 100° F., the ratio of HF-$BF_3$ liquid to dialkyl benzenes being less than that giving substantially complete solubility of the dialkyl benzenes in said liquid mixture, separating a liquid HF and $BF_3$ extract phase containing selectively extracted dialkyl benzenes from a liquid phase containing undissolved isomeric dialkyl benzenes, the ratio of dialkyl benzene isomers in the extract being materially different from the ratio thereof in said original mixture, and recovering said isomeric dialkyl benzene compounds from the extract phase.

3. A process of treating a mixture of isomeric lower dialkyl benzenes which comprises diluting said mixture with a volatile lower normal paraffin, feeding said diluted mixture to a liquid phase extraction zone, selectively extracting a dialkyl benzene composition isomeric to the mixture of dialkyl benzenes in the feed by contacting said feed at a temperature not above 100° F. with alkyl benzene compounds from a liquid phase containing undissolved isomeric dialkyl benzene compounds, the ratio of dialkyl benzene isomers in the extract being materially different from the ratio thereof in said original mixture, and recovering said isomeric dialkyl benzene compounds from the extract phase.

4. A process for separating a hydrocarbon liquid consisting predominantly of lower dialkyl benzene isomers which comprises extracting the hydrocarbon liquid at a temperature not above about 100° F. with an amount of HF-$BF_3$ sufficient to form a distinct phase, but insufficient to dissolve all of the aromatic hydrocarbons in said liquid whereby an HF-$BF_3$ phase enriched in the meta dialkyl benzene isomer is formed.

5. The process as defined in claim 4 wherein the dialkyl benzene isomers are xylenes.

6. A process of separating a xylene mixture containing at least meta and para xylenes which comprises the steps of contacting said xylene mixture at a temperature not above about 100° F. with a liquid consisting of HF and $BF_3$ and containing in excess of 1% by weight of $BF_3$, the ratio of HF-$BF_3$ liquid to xylene mixture being sufficient to form separate layers and the xylenes being present in an amount exceeding their substantially complete solubility in the HF-$BF_3$ liquid, separating a liquid HF-$BF_3$ extract phase enriched with meta xylene from the immiscible xylene phase, and recovering a xylene fraction isomeric to the mixture of xylenes in the feed.

7. The process of claim 6, wherein said liquid HF-$BF_3$ mixture contains about 10–50% by weight of $BF_3$.

8. A process of treating a fraction of isomeric lower dialkyl benzenes which comprises contacting in at least one step said aromatic fraction with a liquid consisting of HF and $BF_3$ at a temperature below about 80° F. and in the presence of a substantially inert diluent immiscible with said HF, $BF_3$ liquid, the ratio of HF, $BF_3$ liquid to dialkyl benzenes being sufficient to form on settling a separate layer of HF, $BF_3$ liquid preferentially enriched with one of said dialkyl benzenes and a separate layer containing the unabsorbed dialkyl benzenes and said diluent, settling and separating said layers, and thereafter separating the dialkyl benzenes from HF and BF₃ in at least one of said layers.

9. The process of claim 8, wherein said diluent is liquid propane.

10. The method of separating meta xylene from a hydrocarbon liquid consisting predominantly of xylene isomers which comprises intimately mixing said hydrocarbon liquid at a temperature not above about 100° F. with a selective solvent consisting essentially of HF and BF₃ and containing at least 10% by weight of BF₃ in amount sufficient to form a distinct liquid phase, settling the mixture to separate an upper hydrocarbon phase and a lower solvent phase enriched in meta xylene, separating the phases and recovering a hydrocarbon rich in meta xylene from the solvent phase.

11. An improved process of separating a mixture of ortho-, meta- and para-xylenes, which comprises the steps of subjecting said mixture to fractionation, whereby ortho-xylene is substantially separated from a fraction of predominately meta- and para-xylenes, contacting said resultant fraction with a liquid consisting of HF containing from about 10 to 50% by weight of BF₃ at a temperature below about 80° F., the ratio of HF, BF₃ liquid to xylenes being sufficient to form on settling a separate layer of HF, BF₃ liquid preferentially enriched with meta-xylene and a separate layer containing the major portion of para-xylene, settling and separating said layers, removing HF and BF₃ from said layers, and recycling at least a portion of said removed HF and BF₃ to said contacting step.

12. The method of separating meta xylene from a liquid hydrocarbon consisting predominantly of xylene isomers which comprises extracting the liquid hydrocarbons at a temperature in the range of about 30° F. to 80° F. with an amount of liquid HF-BF₃ sufficient to form a distinct phase, but insufficient to dissolve all of the aromatic hydrocarbons in the hydrocarbon liquid, separating a raffinate phase and an extract phase enriched in meta xylene and recovering meta xylene from the extract phase.

13. The method of separating meta xylene from a liquid hydrocarbon mixture consisting predominantly of xylene isomers which comprises extracting the liquid hydrocarbons at a temperature below 100° F. with a volume of HF-BF₃ less than the volume of the hydrocarbon mixture, but sufficient to form a distinct phase, said HF-BF₃ containing at least 10% by weight of BF₃, separating a raffinate phase having a reduced meta xylene content relative to the hydrocarbon mixture and an extract phase comprising HF-BF₃ and meta xylene, and separating from the extract phase a hydrocarbon liquid having a high meta xylene content relative to the hydrocarbon mixture.

14. A process for separating meta xylene from a liquid hydrocarbon mixture consisting predominantly of xylene isomers which comprises adding from 0.5 to 2.5 volumes of a low boiling paraffinic hydrocarbon to 1 volume of the hydrocarbon mixture and extracting the resulting mixture at a temperature below about 80° F. with from 2 to 4 volumes of HF-BF₃ containing 10 to 50% by weight of BF₃ to selectively remove meta xylene from the mixture.

LLOYD F. BROOKE.
GORDON E. LANGLOIS.
ARTHUR E. STICKLAND.

REFERENCES CITED

The following references are of record in the file of this patent:

UNITED STATES PATENTS

| Number | Name | Date |
|---|---|---|
| 2,343,744 | Burk | Mar. 7, 1944 |
| 2,343,841 | Burk | Mar. 7, 1944 |
| 2,378,762 | Frey | June 19, 1945 |
| 2,404,591 | Naragon | July 23, 1946 |
| 2,425,559 | Passino et al. | Aug. 12, 1947 |

---

Certificate of Correction

Patent No. 2,521,444      September 5, 1950

LLOYD F. BROOKE ET AL.

It is hereby certified that error appears in the printed specification of the above numbered patent requiring correction as follows:

Column 18, line 26, strike out "said feed at a temperature not above 100° F. with" and insert the same before the words "a liquid" in line 1, same column;

and that the said Letters Patent should be read as corrected above, so that the same may conform to the record of the case in the Patent Office.

Signed and sealed this 14th day of November, A. D. 1950.

[SEAL]

THOMAS F. MURPHY,
*Assistant Commissioner of Patents.*